United States Patent
Van Der Gaag et al.

(10) Patent No.: US 10,219,655 B2
(45) Date of Patent: Mar. 5, 2019

(54) FOOD PROCESSOR DRIVEN BY AN ELECTRIC MOTOR

(71) Applicant: Vorwerk & Co. Interholding GmbH, Wuppertal (DE)

(72) Inventors: Velina Van Der Gaag, Wuppertal (DE); Sabrina Hoffmann, Solingen (DE); Miron Sernecki, Hagen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 162 days.

(21) Appl. No.: 15/030,475

(22) PCT Filed: Oct. 14, 2014

(86) PCT No.: PCT/EP2014/071949
§ 371 (c)(1),
(2) Date: Apr. 19, 2016

(87) PCT Pub. No.: WO2015/058995
PCT Pub. Date: Apr. 30, 2015

(65) Prior Publication Data
US 2016/0249771 A1  Sep. 1, 2016

(30) Foreign Application Priority Data

Oct. 24, 2013 (DE) .......... 10 2013 111 720
Jan. 28, 2014 (DE) .......... 10 2014 100 944
Sep. 22, 2014 (DE) .......... 10 2014 113 623

(51) Int. Cl.
*A47J 43/00* (2006.01)
*A47J 43/07* (2006.01)
(Continued)

(52) U.S. Cl.
CPC ............. *A47J 43/07* (2013.01); *A47J 36/32* (2013.01); *B01F 15/06* (2013.01); *G06F 3/011* (2013.01); *G06F 3/16* (2013.01); *B01F 2015/062* (2013.01)

(58) Field of Classification Search
CPC . A47J 43/07; A47J 36/32; B01F 15/06; B01F 2015/062; G06F 3/011; G06F 3/16
See application file for complete search history.

(56) References Cited

U.S. PATENT DOCUMENTS 7,520,659 B2 * 4/2009 Wulf ..................... A47J 43/042
366/198
9,290,307 B2  3/2016 Arnold et al.
(Continued)

FOREIGN PATENT DOCUMENTS

DE       102 10 442 A1    9/2003
DE  10 2010 060 650 A1    5/2011
(Continued)

OTHER PUBLICATIONS

International Search Report of PCT/EP2014/071949, dated Nov. 27, 2014.
(Continued)

*Primary Examiner* — Anshu Bhatia
(74) *Attorney, Agent, or Firm* — Collard & Rose, P.C.

(57) ABSTRACT

A food processor driven by en electric motor includes a stirrer vessel and a stirring mechanism in the stirrer vessel, an optional heater, and also a volatile or non-volatile memory in which useful date for using the food processor can be stored. The food processor is provided with a loudspeaker and a data file is used for producing sound by the loudspeaker, for example for outputting speech, music or sounds.

10 Claims, 1 Drawing Sheet

(51) Int. Cl.
*A47J 36/32* (2006.01)
*B01F 15/06* (2006.01)
*G06F 3/01* (2006.01)
*G06F 3/16* (2006.01)

(56) References Cited

U.S. PATENT DOCUMENTS

| | | | |
|---|---|---|---|
| 2003/0179645 A1 | 9/2003 | Seul | |
| 2004/0267382 A1* | 12/2004 | Cunningham | H04B 3/542 |
| | | | 700/22 |
| 2005/0068846 A1 | 3/2005 | Wulf et al. | |
| 2008/0089528 A1* | 4/2008 | Klossowski | G10K 11/16 |
| | | | 381/71.3 |
| 2010/0270285 A1* | 10/2010 | Qian | A47J 27/004 |
| | | | 219/441 |
| 2013/0003490 A1 | 1/2013 | Kemker et al. | |
| 2015/0305566 A1 | 10/2015 | Koetz | |

FOREIGN PATENT DOCUMENTS

| | | |
|---|---|---|
| DE | 10 2011 051 149 A1 | 4/2012 |
| DE | 10 2011 052 405 A1 | 1/2013 |
| DE | 10 2013 113 084 A1 | 6/2014 |
| WO | 2014/083029 A1 | 6/2014 |

OTHER PUBLICATIONS

Response from European Patent Attorneys to European Patent Office in PCT/EP2014/071949, dated May 12, 2015.

* cited by examiner

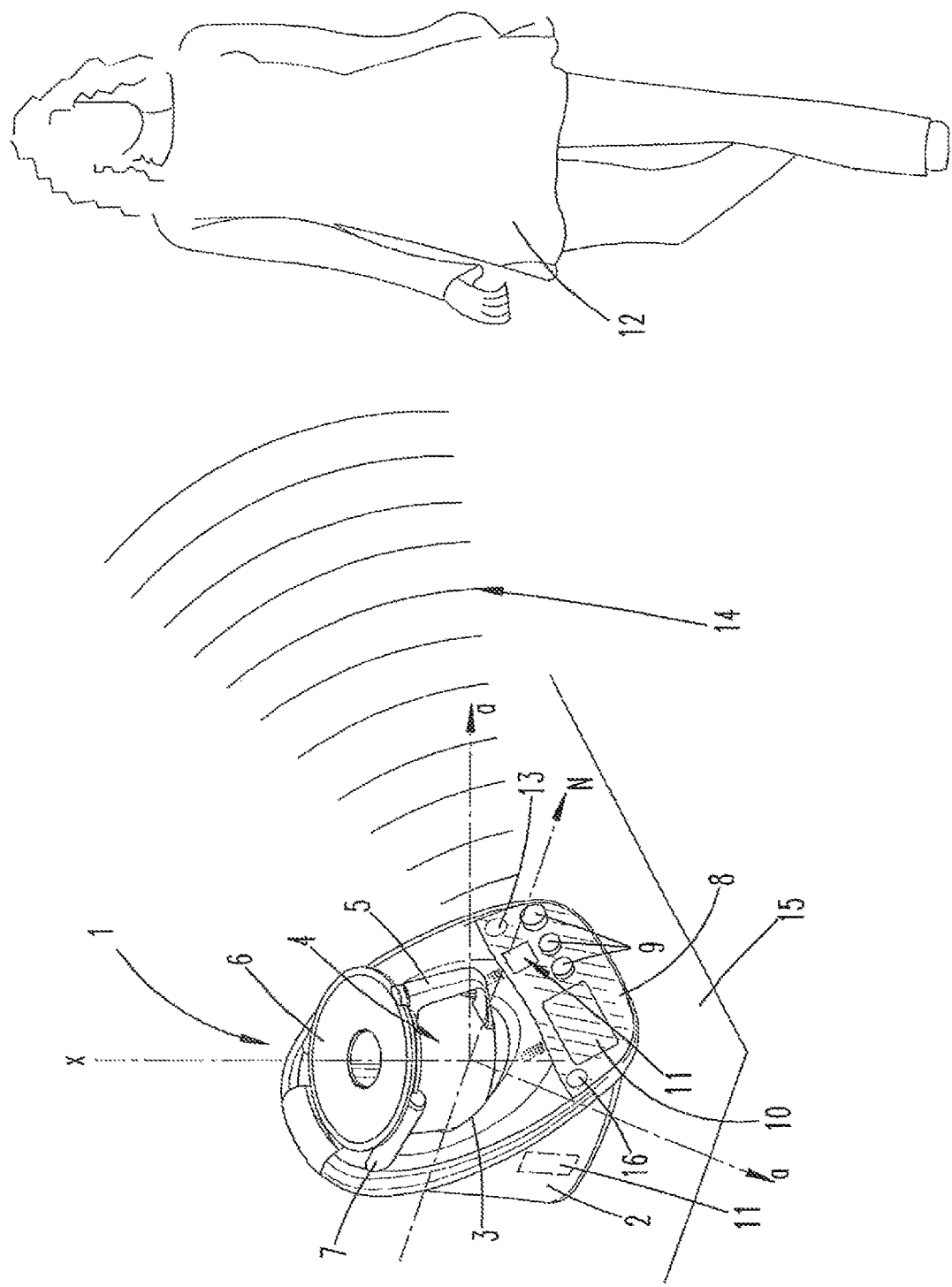

FOOD PROCESSOR DRIVEN BY AN ELECTRIC MOTOR

CROSS REFERENCE TO RELATED APPLICATIONS

This application is the National Stage of PCT/EP2014/071949 filed on Oct. 14, 2014, which claims priority under 35 U.S.C. § 119 of German Application Nos. 10 2013 111 720.1 filed on Oct. 24, 2013; 10 2014 100 944.4 filed on Jan. 28, 2014; and 10 2014 113 623.3 dated Sep. 22, 2014, the disclosures of which are incorporated by reference. The international application under PCT article 21(2) was not published in English.

The invention relates to a food processor driven by an electric motor, with an agitator vessel and an agitator in the agitator vessel, if necessary with a heater, further with a volatile or nonvolatile memory, in which files useful for application can be stored, wherein a loudspeaker is further provided in the food processor, and a file can be used for sound generation by the loudspeaker, for example for voice or music or tone output.

Food processors of the kind in question are known. They are used in particular in households to prepare foods, and further preferably for making meals. To this end, these types of food processors are provided with a vessel that can preferably be removed from the food processor, in which the preparation takes place. In a known embodiment, the floor of such a vessel exhibits an agitator, which can be driven by an electric motor provided in the food processor. Further known in this regard is to heat the agitator vessel directly or even the foods located therein indirectly, in particular for correspondingly cooking foods.

For example, reference is here made to DE 10210442 A1.

Also known are food processors that exhibit a volatile or even nonvolatile memory, wherein files can be stored in this memory. For example, files like these are used for processing recipes, e.g., after a corresponding command invocation, by having the accessed file also set various parameters, such as an agitator speed and/or a heating temperature and/or a time span.

Known from US 2003/0179645 A1 is a food processor in which a sound is output to indicate that the food processor is in operation. Known from US 2005/0068846 a1 is to output a sound in a food processor once a preprogrammed routine has been completely executed, ingredients are to be added, or if a user presses an actuator button.

US 2010/0270285 A1 discloses a food processor with a sound output, specifically a voice output. Something comparable is also known from WO 2014/083029 A1.

As relates to the previously described prior art, the invention pursues the object of further improving a food processor of the kind in question, in particular with regard to a user-friendly utilization of the machine.

This object is initially achieved by a food processor driven by an electric motor, in accordance with one aspect of the invention, with an agitator vessel and an agitator in the agitator vessel, if necessary with a heater, further with a volatile or nonvolatile memory, in which files useful for application can be stored, wherein a loudspeaker is further provided in the food processor, and wherein a file is usable for sound generation by the loudspeaker, for example for voice or music or tone output. The output is coupled with a preset time selection in terms of an agitator and/or heater activity, and takes place within this selected period at a specific point in time. The purpose is to couple the output with a preset time selection in terms of an agitator and/or heater activity, and have it take place within this selected period at a specific point in time.

This object is further achieved in the food processor according to another embodiment, wherein the purpose is to reduce a speed of the agitator given a voice output that takes place with the agitator running.

This object is also achieved in another embodiment, wherein the purpose is to have the food processor exhibit a noise cancellation device, which generates counter-noises as a function of the noise produced by the food processor.

In addition, the object is achieved in another embodiment, wherein the purpose is to have the food processor exhibit a recognition device for recognizing a human user, wherein the position of the user relative to the food processor can at the same time also be recognized in relation to a top view.

This object is also achieved in another embodiment, wherein the purpose is to have an output that can be triggered by the response of a motion detector arranged in the food processor.

A transfer of information from the food processor to the user even if no visual contact with the food processor exists, for example. The information is preferably transferred acoustically. To this end, the food processor integrates at least one loudspeaker. In another embodiment, several such loudspeakers can be provided, which output a corresponding sound in a simultaneous or alternatively delayed manner. Given the arrangement of several loudspeakers, it is also possible to output a separate sound through each loudspeaker.

In addition, the voice output option allows handicapped users, in particular visually impaired users, to transfer information.

A voice output can here be designed in such a way as to provide the user with stored instructions for operating the food processor and/or processing a recipe, and potentially also status reports. A musical piece the like can also be stored as a file for sound generation, e.g., in the MP3 format. For example, a music output can take place during a processing step of the food processor. Tone outputs include a ring tone or gong tone, for example.

Another preferred embodiment provides that the output can be triggered via the loudspeaker by touching or actuating an operating element of the food processor. These types of operating elements serve in particular to indirectly or directly actuate electronic components of the food processor, for example to actuate a heater or an agitator in the agitator vessel, and beyond that to set a duration of activation for the agitator and/or heater, for example.

Within the meaning of the invention, an operating element is also a touch display, e.g., of the kind known from DE 10 2011 052 405 A1. Such a touch display preferably also makes it possible to actuate the electronic components, and further preferably to select a stored recipe.

The sound can here preferably be output by touching or actuating the operating element. For example, the actuation of an operating element for turning on the actuator can be combined with a warning, which indicates that a cover for the agitator vessel might not be locked. For example, this warning can be a specific voice output, or alternatively a tone output in the form of a warning tone.

For example, depending on the selected recipe, a music file associated therewith can be output from the recipe database. In addition to related information about new recipes or used recipes, along with recipe variants, background information about recipes and ingredients are also possible, for example. Also possible beyond that for specific recipes are anecdotes, especially in conjunction with a voice output. For example, background information can be the kind that reports on the growing region of specific ingredients, like spices, or on the specific effects of certain ingredients on the human physique.

For example, background information is preferably output in periods where the food processor is busy with preparing foods (e.g., in a cooking process or heating phase), or also at times where the user must perform his or her own manual operations outside of the food processor. The information can also take the fore of recipe tips or involve cleaning or improving the operation of the food processor.

In a further preferred embodiment, information, such as tips in the form of voice outputs, in particular as relate to general operation, are output less often with increasing operating frequency. Accordingly, the frequency with which the user operates the food processor is here stored as a function of application or operation. This can be broken down by conditions or uses of the agitator vessel during a turbo function, normal agitator speed and/or use of the Varoma attachment.

Sound outputs, in particular voice outputs, can also be repeated at the request of the user, e.g., by correspondingly touching or actuating an operating element designed to do so.

In routinely performed or retrieved recipes, any tips in the form of voice outputs can diminish over time.

With respect to the motion detector, a proximity sensor is preferably provided in the food processor, in particular in the area of the food processor housing, and further preferably monitors the vicinity of the food processor. Preferably provided is a vicinity of 100 cm or less, further preferably of 50 cm or less, wherein a motion can be detected in this area. Such a motion in the monitored area preferably leads to the output of a sound in the form of a voice or music or tone output. As a result of this embodiment, a sound generation is correspondingly initiated, for example, when the user approaches the food processor, e.g., to check on a cooking process. For example, a voice output can announce the next preparation step and/or remaining duration of the cooking process at this moment in time.

Also advantageous in this conjunction is that, as further preferred, an output be triggerable as a function of a specific operating state of the food processor. For example, such an operating state includes turning on the food processor, if necessary from a standby mode. Additional operating states within the framework of the invention include an agitating phase or heating phase, for example, and beyond that especially a type of phase within a time window prescribed by a program or the user.

Such an operating state can also involve a configuration of the food processor, for example solely placing a cover on the agitator vessel or further placing a cooking vessel on the cover of the agitator vessel.

Further preferably to be understood by the operating state is also a current step within a recipe sequence, both given a manually executable recipe sequence, in which the user calls up the next recipe step after each recipe step, for example by actuating an operating element, as well as an automatic recipe sequence, in which a recipe is automatically executed, especially as relates to the selection of speed and/or heating temperature.

In an embodiment, the output is coupled with a preset time selection in terms of an agitator and/or heater activity, and further preferably takes place within this selected period at a specific point in time. For example, a remaining time check can be performed, e.g., to alert the user that the process currently underway will end, for example in five minutes. The specific point in time within the preset time selection can also indicate that the user must initiate a specific process after a period yet to elapse (e.g., add ingredients). In a preferred embodiment, the user selects the time, i.e., the period within which the output takes place at a specific point in time; alternatively, this is done by a program controller.

With respect to the voice output that takes place with the agitator running, a reduction in the speed of the agitator can advantageously yield a distinct, audible voice output. The reduction in speed is here limited in time, in particular to the time required for the voice output. In a preferred embodiment, after the voice output has ended, the agitator speed is correspondingly automatically raised to the speed that prevailed prior to the reduction.

With respect to the noise cancellation device in the food processor, the counter-noises are output by way of the loudspeaker provided in the food processor. A so-called noise cancellation (active noise reduction ANR) is here used.

The sound produced by the food processor is preferably acquired directly at the food processor and/or in direct proximity to the food processor, to which end a microphone or the like is preferably provided. Another preferably provided evaluation electronics retrieve a file for tone output based on the evaluation of sounds recorded. The evaluation electronics are provided in the food processor in one embodiment. In this regard, it is also possible to have externally provided evaluation electronics, which are able to communicate with the food processor. Noise cancellation can involve in particular a motor noise and/or agitator noise and/or agitator vessel noise. The agitator vessel noise can be caused especially by secondary effects. A secondary effect can stem from the agitator accelerating solids, for example frozen raspberries, against the agitator vessel wall.

In any event, the other noises are preferably cancelled during a voice or music or tone output, in particular when outputting information to the user. Any evaluation electronics provided are preferably geared toward not allowing such deliberately output sounds to lead to an adjusted noise cancellation.

With respect to the recognition device, in particular personalized messages, for example greeting texts, can be output. In a further preferred embodiment, the position of the user relative to the food processor is recognized with an electronic camera that is preferably accommodated in the food processor, further in particular in the housing of the food processor. This camera supplies images to a facial recognition device with a face database provided in the food processor. This type of facial recognition device is discussed in 10 2013 113 084, for example. Such a facial recognition device is used to first recognize a human user, in particular in a prescribed acquisition area, and further to identify the respective person via comparison with a face database. As a result of this embodiment, the person operating the food processor can be addressed quasi personally, for example by outputting an adjusted voice file.

In a further preferred embodiment, the output of the sound, in particular of the voice in a recognition device, can foe adjusted in terms of the radiation direction relative to a zero axis. The radiation direction can at any rate thus be adjusted relative to a horizontal axis, correspondingly making it possible to achieve a sound propagation directed toward the user, in particular of the voice output. In a further preferred embodiment, a correspondingly directed loudspeaker from among an array of several loudspeakers is actuated.

In addition, a bidirectional connection is preferably provided between the food processor and user, e.g., such that the user poses a question that is stored in a database, and hence known, and the food processor quasi answers, or such that the user voices commands that the food processor repeats and executes after a verbal confirmation.

Furthermore, a sound output is preferably also provided with the food processor in the standby mode, for example for greeting the approaching user.

One or more of the features described above indicate a food processor that produces intrinsic sounds apart from the operating noises, which in particular transfers information to the user by way of a voice or music or tone output. In a further embodiment, these specifically output sounds can also be sent to the user in remote rooms via radio waves, wherein the user in this instance carries a corresponding receiver with loudspeaker or headphones, for example.

The invention is explained below based on the attached drawing, but the latter only depicts an exemplary embodiment. Shown on the drawing:

FIG. 1 is a schematic, perspective view of a food processor in the operating position, with a human user facing the food processor.

Illustrated and described is a food processor 1 driven by an electric motor. Preferably involved here in a food processor according to DE 10210442 A1 and/or DE 10 2011 051 149 and/or DE 102010060650 A1. The contents of these patent applications will hereby be completely integrated into the disclosure of the present invention, also for the purpose of including features of these patent applications in claims of the present invention.

The food processor 1 exhibits a housing 2. This housing 2 preferably incorporates control electronics for the food processor 1. The housing 2 further exhibits an agitator vessel receptacle 3. An agitator vessel 4 is situated therein, in particular in the use position of the food processor 2.

The agitator vessel 4 is pot-shaped, and preferably exhibits a handle 5.

The agitator opening is further preferably overlapped by a cover 6, in particular in the use position. The latter can further preferably be fixed on the housing 2, to which end activatable fixing means 7 are provided.

An agitator (not shown) is further preferably situated on the floor of the agitator vessel 4. The latter is joined with an electric motor (not shown) in the food processor 1, with a detachable coupling interposed.

The agitator vessel 4 is further preferably beatable, in particular by configuring the agitator vessel floor as an electrical resistance heater.

The housing 2 further preferably forms a control panel 8. Preferably provided in this control panel 8 are regulating switches 9, wherein these regulating switches 9 serve in particular for setting an agitator speed and/or a heating temperature and/or a duration for which the agitator and/or heater is activated.

Additionally provided in the control panel 8 in the depicted embodiment is a display 10, in particular for indicating the set parameters, such as agitator speed, heating temperature and/or duration.

In another embodiment, the display 10 is designed as a touch display. Such a touch display 10 allows the user to potentially retrieve a recipe for the food processor 1 to potentially automatically process.

In addition, the housing 2 preferably incorporates a non-volatile memory, in which files for sound generation are stored.

A loudspeaker 11 is provided for sound output. The latter is preferably integrated in the area of the control panel 8, and further in particular in an outer surface of the housing 2.

As exemplarily shown on the drawing, the loudspeaker 11 can also be situated to the side in the housing 2, as can a plurality of loudspeakers 11 as well.

Output via the loudspeaker 11 are sounds, in particular voice, music or tons sounds, which are intended in particular to provide information to a human user 12. Alternatively, the sound serves to cancel or at least attenuate the noises generated by the food processor 1 during operation, further produced in particular by the agitator.

Tone sounds can include a gong or a bell. Within the meaning of the invention, music output is understood as the output of melodic tones, further preferably portions of musical pieces or entire musical pieces.

Apart from individual voice or music or tone outputs, combined outputs can also take place, for example a voice output stored with music. In this way, specific, differentiated information can be imparted to the user 12 by way of a melodic tone. Also possible are voice outputs in different languages, as well as in various voices. To this end, the user 12 makes a preselection, for example by entering the appropriate commands via the touch display 10.

Additionally provided in conjunction with a corresponding language or voice selection is that there be a user recognition. To this end, a recognition device is provided, in particular in the form of a camera 13 provided in the control panel 8, for example. The latter is preferably coupled with a facial recognition device according to DE 10 2013 113 084. The contents of this patent application will hereby be completely integrated into the disclosure of the present invention, also for the purpose of including features of this patent application in claims of the present invention.

As a function of the recognized user 12, a pre-s elected language and/or voice is output in a preferred embodiment. In addition, it is also possible in this conjunction to personally address the user 12, for example via a voice output of the name as part of a greeting text.

During recipe selection, information can be output about new recipes or used recipes, and further about recipe variants. As an option, anecdotes can also be output for certain recipes, as further preferably can information and tips about preparing and cooking the ingredients provided in the recipe. For example, supplements or the like can also suggested by voice output, depending on the selected recipe.

If a time selection has been preset, for example with respect to the agitator and/or heater, a voice output concerning the time still remaining can take place within the selected time window. Such an output preferably takes place automatically at preset remaining times, for example 5 minutes, 2 minutes or 1 minute before the selected time expires. Alternatively or also combinative thereto, the user 12 can also effect a voice output for announcing the time by inputting a command, for example by actuating a button or switch of the food processor 1.

In particular during a voice output, but beyond that also given a music or tone output limited in time, a preferred embodiment provides for reducing the speed of the agitator, which is done automatically.

The orientation (arrow a) of the sound 14, in particular during a voice output, is further preferably directed toward the location of the user 12. The camera 13 is used for this purpose in one embodiment. In another alternative embodiment, a transceiver unit is provided to this end, wherein this transceiver unit acquires the angle of the incident reflection sound waves. In particular as a function of a zero axis N, the ascertained angle is used to activate or further actuate the loudspeaker(s) 11 pointing in the respective direction for voice output.

The zero axis N preferably runs perpendicular to an agitator vessel axis x, further preferably in a parallel plane to the installation surface of the food processor 1. In the exemplary embodiment shown, the zero axis N proceeds from the agitator vessel axis x and proceeds radially, intersecting the area of the agitator vessel handle 5 and control panel 8 in a vertical projection onto the installation surface 15.

The output of information sounds also depends on the distance between the food processor 1 and user 12. Such an output is preferably released generally or even limited to specific information when the user 12 is located in direct proximity to the food processor 1. To this end, a further preferred embodiment provides a motion detector 16, which is situated in the food processor 1, further preferably in the area of the control panel 8. Proceeding from the latter, this motion detector 16 preferably acquires an area of about 30 to 100 cm, further preferably of about 50 cm, wherein the user 12 must be located in this area to potentially trigger a sound output. In this way, persons located at a greater distance from the food processor 1 or persons passing by are advantageously prevented from triggering any corresponding sound output.

REFERENCE LIST

1 Food processor
2 Housing
3 Agitator vessel receptacle
4 Agitator vessel
5 Handle
6 Cover
7 Fixing means
8 Control panel
9 Regulating switch
10 ID Display
11 Loudspeaker
12 User
13 Camera
14 Sound
15 Installation surface
16 Motion detector
a Arrow
x Agitator vessel axis
N Zero axis

The invention claimed is:

1. A food processor comprising:
(a) an electric motor;
(b) an agitator vessel;
(c) an agitator in the agitator vessel;
(d) a loudspeaker;
(e) a volatile or nonvolatile memory;
(f) files useful for application stored in the memory comprising a sound generation file for sound file for sound generation by the loudspeaker; and
(g) control electronics;
wherein the control electronics are configured to control an output of the sound by the loudspeaker such that the sound output is coupled with a preset time selection in terms of activity of the agitator;
wherein the control electronics are configured to control the output of the sound via the loudspeaker such that the sound output takes place within the preset time selection at a specific point in time; and
wherein the control electronics are further configured to perform a remaining time check and to alert a user that a process currently underway will end and/or that the user must initiated a specific process after a period yet to elapse.

2. The food processor according to claim 1, wherein the speed of the agitator is reduced given a voice output that takes place with the agitator running.

3. The food processor according to claim 1, wherein the food processor exhibits a noise cancellation device, which generates counter-noises as a function of the noise produced by the food processor.

4. The food processor according to claim 3, wherein the other noises are in any event cancelled during a voice or music or tone output.

5. The food processor according to claim 1, wherein the food processor exhibits a recognition device for recognizing a human user, and wherein the position of the user relative to the food processor can also be recognized in relation to a top view.

6. The food processor according to claim 5, wherein the output can be adjusted in terms of the radiation direction for a directed sound propagation relating to the user relative to a zero axis.

7. The food processor according to claim 1, wherein an output can be triggered by the response of a motion detector arranged in the food processor.

8. The food processor according to claim 1, wherein the output can be triggered via the loudspeaker by touching or actuating a control element of the food processor.

9. The food processor according to claim 1, wherein an output can be triggered as a function of a specific operating state of the food processor.

10. A food processor comprising:
(a) an electric motor;
(b) a vessel;
(c) a heater;
(d) a volatile or nonvolatile memory;
(e) a loudspeaker;
(f) control electronics;
wherein the memory is configured to store files useful for an application,
wherein the loudspeaker is configured to generate sound from a file of files stored in the memory,
wherein the control electronics are configured to control an output of the sound by the loudspeaker such that the sound output is coupled with a preset time selection in terms of activity of the heater;
wherein the control electronics are configured to control the output of the sound via the loudspeaker such that the sound output takes place within the preset time selection at a specific point in time; and
wherein the control electronics are further configured to perform a remaining time check and to alert a user that a process currently underway will end and/or that the user must initiated a specific process after a period yet to elapse.

* * * * *